(12) United States Patent
Fang

(10) Patent No.: US 11,299,227 B1
(45) Date of Patent: Apr. 12, 2022

(54) PORTABLE MOBILE PHONE STORAGE BOX FOR BICYCLING

(71) Applicant: Songke Fang, Guangdong (CN)

(72) Inventor: Songke Fang, Guangdong (CN)

( * ) Notice: Subject to any disclaimer, the term of this patent is extended or adjusted under 35 U.S.C. 154(b) by 0 days.

(21) Appl. No.: 17/166,008

(22) Filed: Feb. 3, 2021

(30) Foreign Application Priority Data

Dec. 24, 2020 (CN) .......................... 202011550997.X

(51) Int. Cl.
*H04M 1/04* (2006.01)
*B62J 9/27* (2020.01)
*B62J 50/21* (2020.01)
*B62J 50/22* (2020.01)

(52) U.S. Cl.
CPC ................. *B62J 9/27* (2020.02); *B62J 50/22* (2020.02); *B62J 50/225* (2020.02); *H04M 1/04* (2013.01)

(58) Field of Classification Search
CPC ...... H04M 1/04; H04M 1/725; H04M 1/0202; H04M 1/67; H04W 4/40; H04W 4/80
See application file for complete search history.

(56) References Cited

U.S. PATENT DOCUMENTS

| | | | |
|---|---|---|---|
| 10,858,061 B2 * | 12/2020 | Montez | B62K 19/40 |
| 10,937,001 B1 * | 3/2021 | Isgar | G07C 1/32 |
| 2016/0221627 A1 * | 8/2016 | Hines | B62J 45/414 |
| 2021/0244995 A1 * | 8/2021 | Andrei | A63B 21/225 |
| 2021/0323424 A1 * | 10/2021 | Montague | B60L 53/18 |

* cited by examiner

*Primary Examiner* — Thanh C Le
(74) *Attorney, Agent, or Firm* — Cooper Legal Group, LLC

(57) ABSTRACT

A portable mobile phone storage box comprises a box body and a mounting mechanism, wherein the box body comprises a base, an upper cover, and a touch screen film. The base is provided with a storage groove. A touch groove is disposed in the top of the upper cover, and a mounting plate is arranged on the upper cover. An adhesive layer is arranged at the bottom of the mounting plate, and the touch screen film and the adhesive layer are bonded to each other by hot melting. A limiting mechanism is mounted at the bottom of the upper cover and comprises a hook and a loop. A shading plate is disposed on one side of the top of the upper cover. The mounting mechanism comprises a fixing seat and a supporting mechanism, wherein the supporting mechanism is mounted at the bottom of the fixing seat.

6 Claims, 3 Drawing Sheets

PORTABLE MOBILE PHONE STORAGE BOX FOR BICYCLING

RELATED APPLICATION

This application claims priority to Chinese Patent Application 202011550997.X, filed on Dec. 24, 2020, which is incorporated herein by reference.

TECHNICAL FIELD

The present disclosure relates to the field of bicycle accessories, in particular to a portable mobile phone storage box for bicycling.

BACKGROUND

Bicycles are green and environmentally friendly tools for riding instead of walking. With the continuous improvement of people's living standards, bicycles have become tools for travel and outdoor sports. Cycling enthusiasts usually put daily necessities, mobile phones, wallets, etc. in bicycle bags. In order to prevent bumps of the bicycle bags, the bicycle bags are mostly fixed on the bicycles with straps during installation, which is not easy to adjust and not beautiful. In addition, a mobile phone touch screen position of the existing mobile phone storage boxes is glued to the storage box, which is easy to crack and cause water seepage, which reduces a water-barrier performance. Furthermore, the existing mobile phone storage boxes have no shading effect and are inconvenient to use.

SUMMARY

In order to overcome the defects in the above situations, the present disclosure provides a portable mobile phone storage box for bicycling. The technical solutions are summarized as follows.

A portable mobile phone storage box for bicycling comprises a box body and a mounting mechanism mounted at a bottom of the box body, wherein the box body comprises a base, an upper cover, and a touch screen film. The base is provided with a storage groove. One side of a bottom of the upper cover is mounted to one side of a top of the base in a hinged manner, and another side of the upper cover is in fastening fit with another side of the base. A touch groove is disposed in a top of the upper cover, the touch screen film is arranged below the touch groove in a covering manner, and a mounting plate is arranged on the upper cover. An adhesive layer is arranged at a bottom of the mounting plate, the touch screen film is mounted at the bottom of the mounting plate, and the touch screen film and the adhesive layer are bonded to each other by hot melting; a limiting mechanism is mounted at the bottom of the upper cover and located below the touch screen film. The limiting mechanism comprises a hook and a loop which are adhesively connected. A shading plate is disposed on one side of the top of the upper cover and arranged around a periphery of the touch screen film. The mounting mechanism comprises a fixing seat and a supporting mechanism, wherein the fixing seat is mounted at a bottom of the base, and the supporting mechanism is mounted at a bottom of the fixing seat.

Further, a raised portion is disposed on a top of one side of the base, and the shading plate is located above the raised portion.

Optionally, the supporting mechanism comprises a first support and a first arc-shaped limiting block, wherein one end of the first support is mounted on the fixing seat, a second arc-shaped limiting block is disposed on one side of a bottom end of the first support, an outer end of the first arc-shaped limiting block is mounted to an outer end of the second arc-shaped limiting block in a hinged manner, and the first arc-shaped limiting block and the second arc-shaped limiting block are connected by a screw.

Optionally, the supporting mechanism comprises a supporting block and a second support, wherein one end of the second support is mounted on the fixing seat, the supporting block is disposed on one side of a bottom end of the second support, and the supporting block is provided with a mounting hole which penetrates through the supporting block.

Optionally, the supporting mechanism comprises an extension frame, a fixing block, and a third support, wherein one end of the third support is mounted on the fixing seat, and one end of the extension frame is disposed on one side of a bottom end of the third support. The fixing block is disposed on another end of the extension frame, the fixing block and the extension frame are perpendicular to each other, and the fixing block is provided with two fixing holes which penetrate through the fixing block respectively.

Optionally, the supporting mechanism comprises a mounting seat and an adjusting mechanism, wherein the mounting seat is mounted at the bottom of the fixing seat and provided with a mounting hole. The adjusting mechanism is mounted on the mounting hole and comprises an adjusting bar and a fixing screw, wherein a mounting block is arranged at a top of the adjusting bar and in limiting fit with the mounting hole. The fixing screw is mounted on the mounting block. The mounting block is provided with a via hole through which a bottom of the adjusting bar passes. The adjusting bar is provided with a plurality of adjusting grooves which is in limiting fit with the fixing screw.

Compared with the prior art, the present disclosure has the following technical effects: after the upper cover is opened, a mobile phone and other items are put into the storage groove, and the mobile phone is then fixed through the bonding of the hook and the loop. The mobile phone is controlled to fit the touch screen film, and the upper cover is then in fastening fit with the base. The mobile phone storage box may be placed in different positions of the bicycle through the mounting mechanism, such that the mobile phone can be directly operated by a touch screen. The touch screen film is fused and bonded to the upper cover through the adhesive layer to prevent cracking between the touch screen film and the upper cover and to enhance the waterproof performance. The shading plate is provided to shade light for a touch screen, thereby providing convenience for using the mobile phone.

Reference symbols represent the following components respectively: 1—box body; 2—mounting mechanism; 3—base; 4—upper cover; 5—touch screen film; 6—storage groove; 7—touch groove; 8—mounting plate; 9—adhesive layer; 10—limiting mechanism; 11—hook; 12—loop; 13—shading plate; 14—fixing seat; 15—supporting mechanism; 16—raised portion; 17—first support; 18—first arc-shaped limiting block; 19—second arc-shaped limiting block; 20—supporting block; 21—second support; 22—mounting hole; 23—extension frame; 24—fixing block; 25—third support; 26—fixing hole; 27—mounting seat; 28—adjusting mechanism; 29—adjusting bar; 30—fixing screw; 31—mounting block; 32—via hole; and 33—adjusting groove.

DETAILED DESCRIPTION

Embodiment 1

Figure 1:
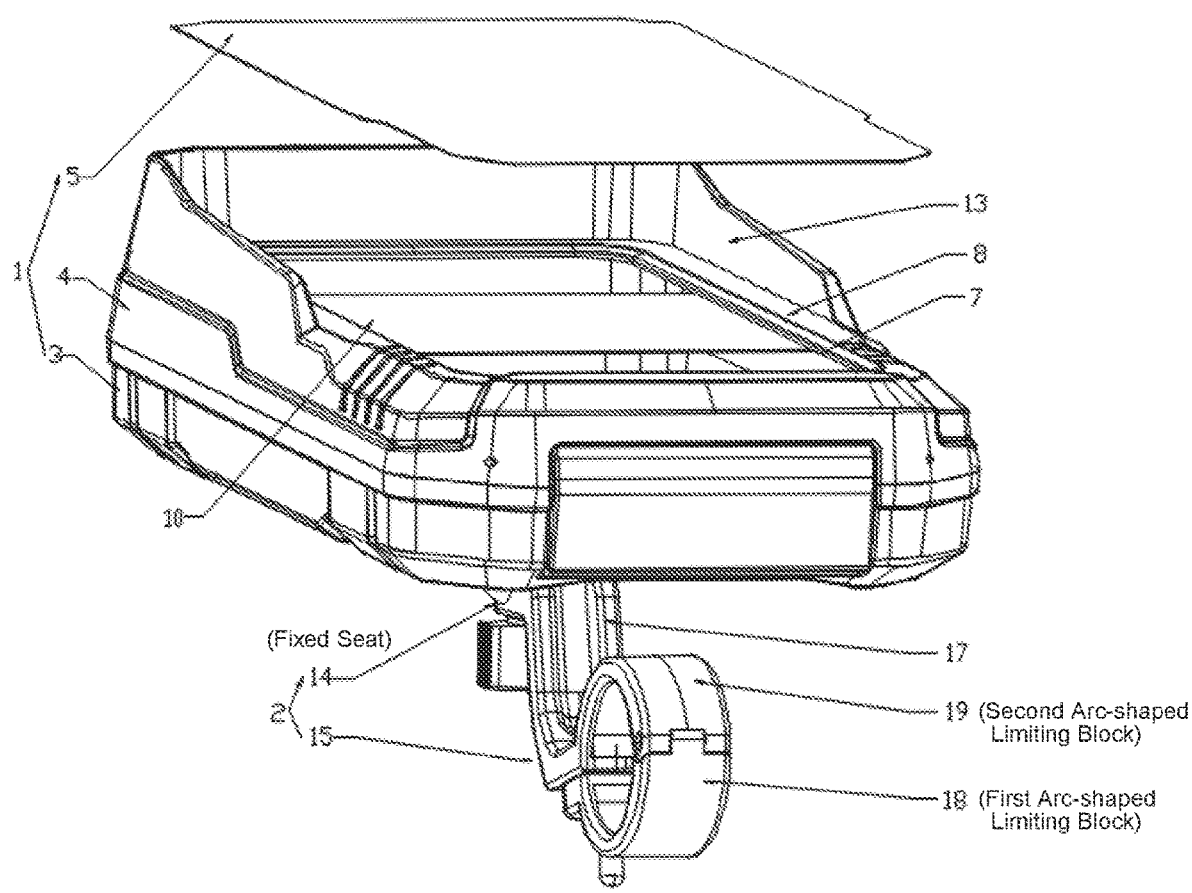
FIG. 1 is a schematic structural diagram of Embodiment 1 in the present disclosure.
Figure 2:
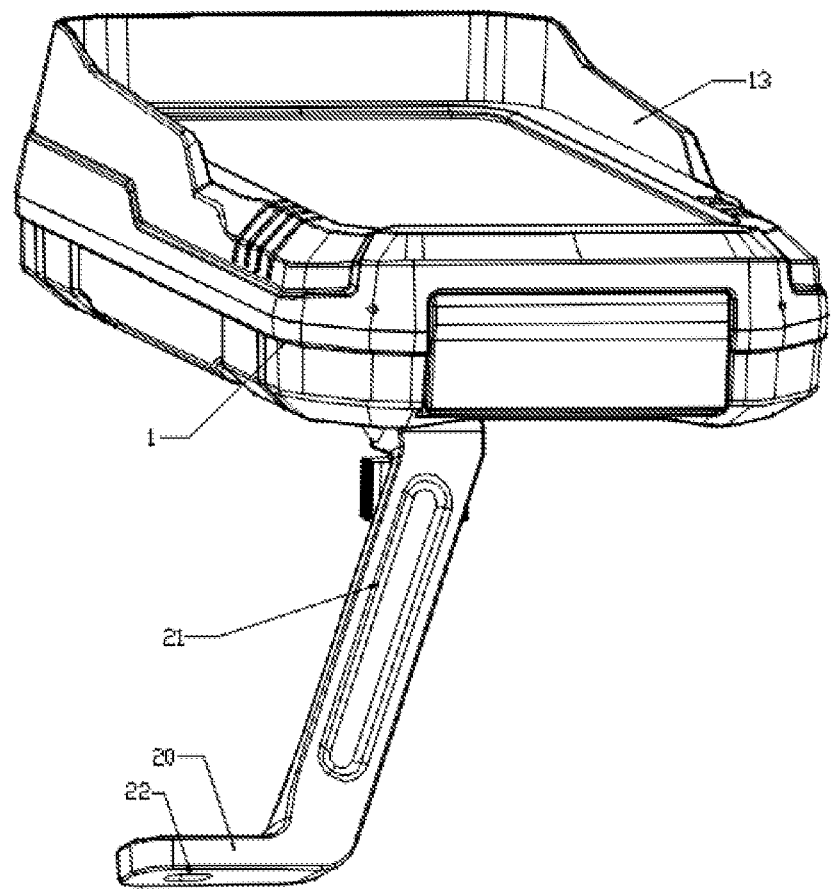
FIG. 2 is a schematic structural diagram of Embodiment 2 in the present disclosure.
Figure 3:
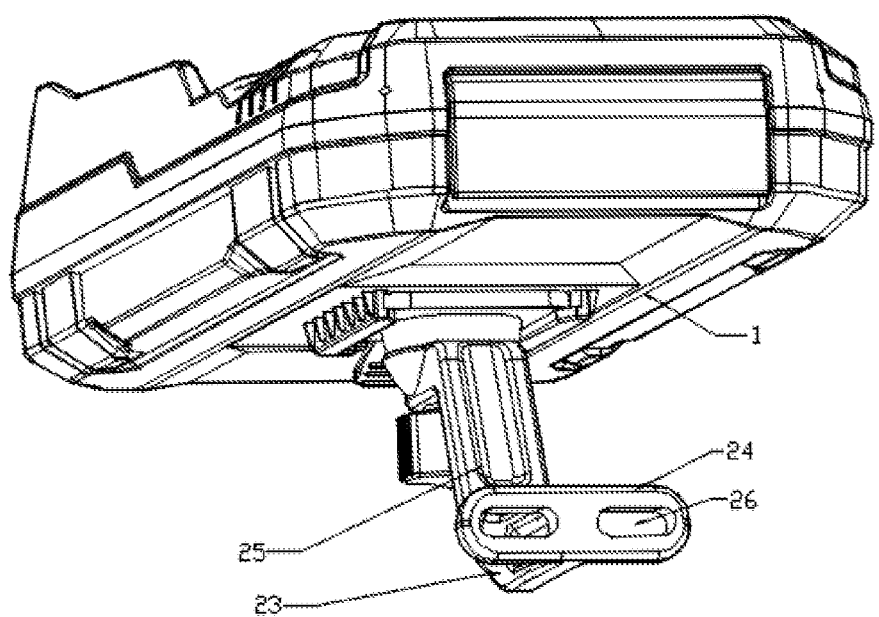
FIG. 3 is a schematic structural diagram of Embodiment 3 in the present disclosure.
Figure 4:
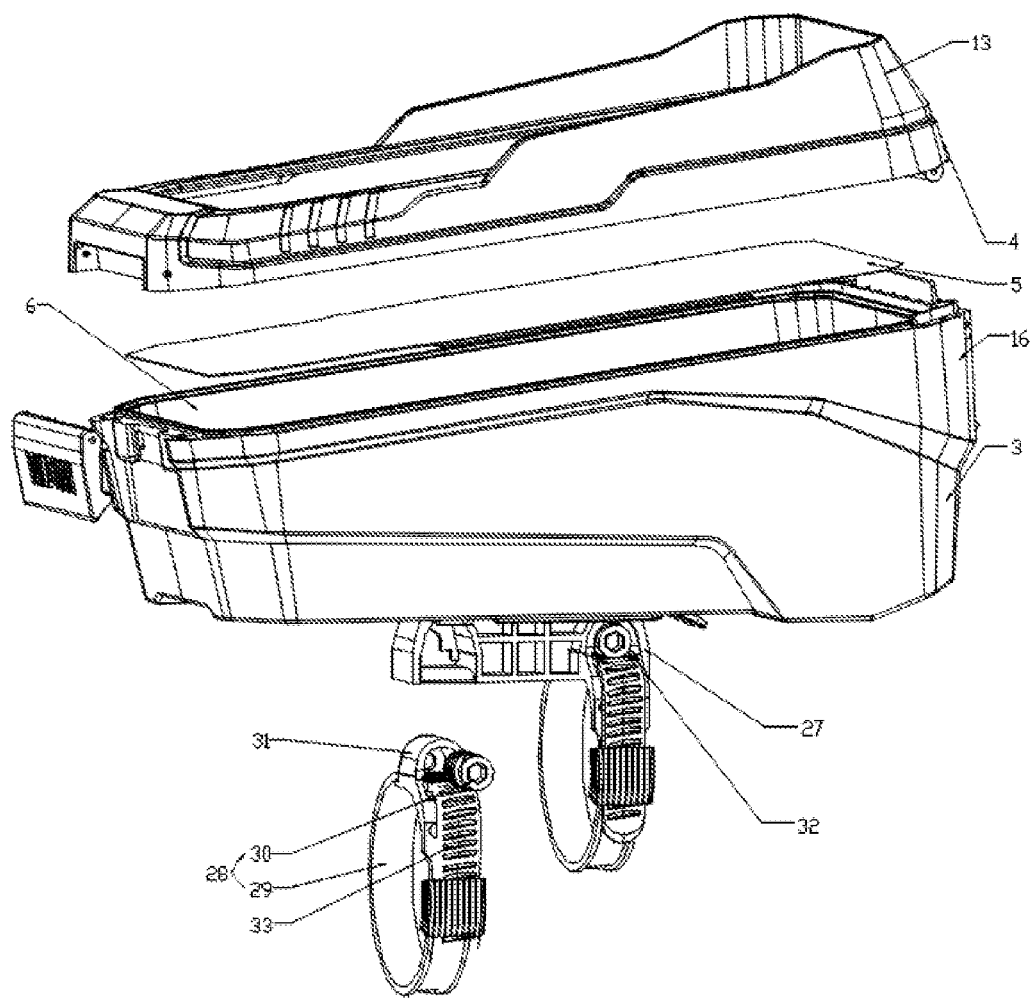
FIG. 4 is a schematic structural diagram of Embodiment 4 in the present disclosure.
Figure 5:
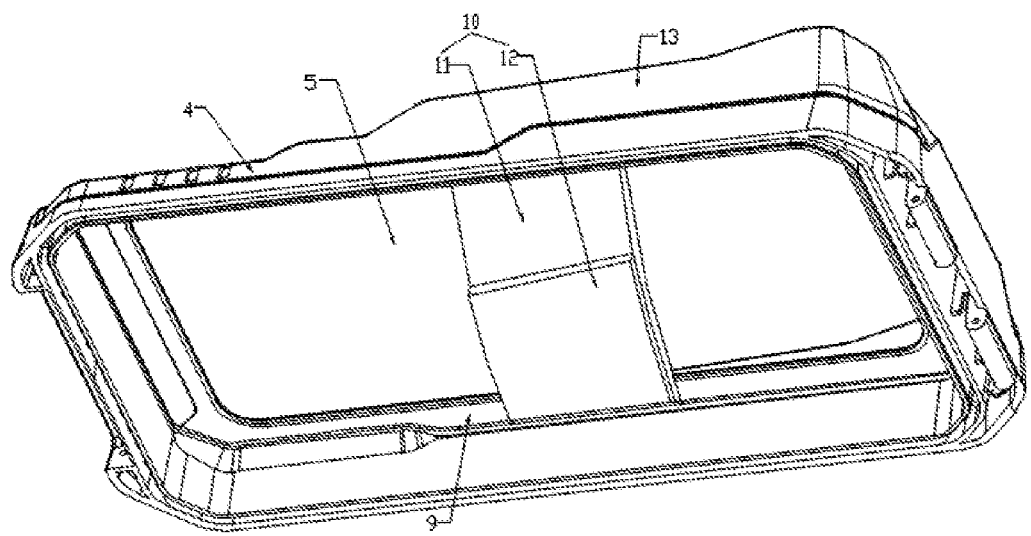
FIG. 5 is a schematic structural diagram of an upper cover in the present disclosure.

As shown in FIGS. 1-5, a portable mobile phone storage box for bicycling comprises a box body 1 and a mounting mechanism 2 mounted at the bottom of the box body 1, wherein the box body 1 comprises a base 3, an upper cover 4, and a touch screen film 5. The base 3 is provided with a storage groove 6. One side of the bottom of the upper cover 4 is mounted on one side of the top of the base 3 in a hinged manner, and the other side of the upper cover 4 is in fastening fit with the other side of the base 3. A touch groove 7 is formed in the top of the upper cover 4, the touch screen film 5 is arranged below the touch groove 7 in a covering manner, and a mounting plate 8 is arranged on the upper cover 4. An adhesive layer 9 is arranged at the bottom of the mounting plate 8, the touch screen film 5 is mounted at the bottom of the mounting plate 8, and the touch screen film 5 and the adhesive layer 9 are bonded to each other by hot melting. A limiting mechanism 10 is mounted at the bottom of the upper cover 4 and located below the touch screen film 5. The limiting mechanism 10 comprises a hook 11 and a loop 12 which are adhesively connected (e.g., the limiting mechanism 10 is a hook-and-loop fastener). A shading plate 13 is formed on one side of the top of the upper cover 4 and arranged around the periphery of the touch screen film 5, and the mounting mechanism 2 comprises a fixing seat 14 and a supporting mechanism 15. The fixing seat 14 is mounted at the bottom of the base 3, and the supporting mechanism 15 is mounted at the bottom of the fixing seat 14.

Further, after the upper cover 4 is opened, a mobile phone and other items are put into the storage groove 6, and the mobile phone is then fixed through the bonding of the hook 11 and the loop 12. The mobile phone is then controlled to fit the touch screen film 5, and the upper cover 4 is then in fastening fit with the base 3. The mobile phone storage box may be placed in different positions of the bicycle through the mounting mechanism 2, such that the mobile phone can be directly operated by a touch screen. The touch screen film 5 is fused and bonded to the upper cover 4 through the adhesive layer 9 to prevent cracking between the touch screen film 5 and the upper cover 4 and to enhance the waterproof performance. The shading plate 13 is provided to shade light for a touch screen, thereby providing convenience for using the mobile phone.

Further, a raised portion 16 is formed at the top of one side of the base 3, and the shading plate 13 is located above the raised portion 16. Since the raised portion 16 is provided and the shading plate 13 is located on one side of the raised portion 16, the light shielding effect can be further enhanced, and a storage space for articles is increased.

In this embodiment, the supporting mechanism 15 comprises a first support 17 and a first arc-shaped limiting block 18. One end of the first support 17 is mounted on the fixing seat 14, a second arc-shaped limiting block 19 is formed on one side of the bottom end of the first support 17, the outer end of the first arc-shaped limiting block 18 is mounted to the outer end of the second arc-shaped limiting block 19 in a hinged manner, and the first arc-shaped limiting block 18 and the second arc-shaped limiting block 19 are connected by a screw. By opening the first arc-shaped limiting block 18, the mounting mechanism 2 is mounted on a cross beam of a bicycle handlebar, and then fixed with screws, such that the mobile phone storage box can be placed on the handlebar.

The specific structure of the supporting mechanism 15 of the present disclosure according to different usage requirements can also be specifically described in the following embodiments:

Embodiment 2

In this embodiment, the supporting mechanism 15 comprises a supporting block 20 and a second support 21. One end of the second support 21 is mounted on the fixing seat 14, the supporting block 20 is formed on one side of the bottom end of the second support 21, and the supporting block 20 is provided with a mounting hole 22 which penetrates through the supporting block 20. The supporting block 20 is placed on the head of the bicycle and fixed through the mounting hole 22, such that the mounting mechanism 2 can be mounted on the top of the head of the bicycle conveniently. The rest is the same as Embodiment 1 and will not be redundantly repeated in this embodiment.

Embodiment 3

In this embodiment, the supporting mechanism 15 comprises an extension frame 23, a fixing block 24, and a third support 25. One end of the third support 25 is mounted on the fixing seat 14, one end of the extension frame 23 is formed on one side of the bottom end of the third support 25, and the fixing block 24 is formed on the other end of the extension frame 23. The fixing block 24 and the extension frame 23 are perpendicular to each other, and the fixing block 24 is provided with two fixing holes 26 which penetrate through the fixing block 24 respectively. The fixing block 24 is placed on the head of the bicycle, the mounting mechanism 2 is fixed through the fixing holes 26, and the mounting mechanism 2 can be mounted on the side of the bicycle body through the extension frame 23. The rest is the same as Embodiment 1 and will not be redundantly repeated in this embodiment.

Embodiment 4

In this embodiment, the supporting mechanism 15 comprises a mounting seat 27 and an adjusting mechanism 28. The mounting seat 27 is mounted at the bottom of the fixing seat 14 and provided with a mounting hole 22. The adjusting mechanism 28 is mounted on the mounting hole 22 and comprises an adjusting bar 29 and a fixing screw 30. A mounting block 31 is arranged at the top of the adjusting bar 29 and in limiting fit with the mounting hole 22. The fixing screw 30 is mounted on the mounting block 31. The mounting block 31 is provided with a via hole 32 through which the bottom of the adjusting bar 29 passes, and the adjusting bar 29 is provided with a plurality of adjusting grooves which are in limiting fit with the fixing screw 30. The bottom of the adjusting bar 29 passes through the via hole 32 after bypassing the crossbeam of the bicycle, and the fixing screw 30 is mounted on the mounting block 31 after appropriate size adjustment, such that the adjusting groove 33 is further limited by the fixing screw 30, thereby preventing the adjusting bar 29 from escaping. The adjusting mechanism 28 is provided to facilitate adjusting the mobile phone storage box. The rest is the same as Embodiment 1 and will not be redundantly repeated in this embodiment.

For those skilled in the art, various other corresponding changes and modifications can be derived according to the structure and principle disclosed in the present disclosure, and all these changes and modifications fall into the protection scope of the present disclosure.

The invention claimed is:

1. A portable mobile phone storage box for bicycling, comprising a box body and a mounting mechanism mounted at a bottom of the box body, wherein the box body comprises a base, an upper cover, and a touch screen film; the base is provided with a storage groove; one side of a bottom of the upper cover is mounted to one side of a top of the base in a hinged manner, and another side of the upper cover is in fastening fit with another side of the base; a touch groove is disposed in a top of the upper cover, the touch screen film is arranged below the touch groove in a covering manner, and a mounting plate is arranged on the upper cover; an adhesive layer is arranged at a bottom of the mounting plate, the touch screen film is mounted at the bottom of the mounting plate, and the touch screen film and the adhesive layer are bonded to each other by hot melting; a limiting mechanism is mounted at the bottom of the upper cover and located below the touch screen film; the limiting mechanism comprises a hook and a loop which are adhesively connected; a shading plate is disposed on one side of the top of the upper cover and arranged around a periphery of the touch screen film; and the mounting mechanism comprises a fixing seat and a supporting mechanism, wherein the fixing seat is mounted at a bottom of the base, and the supporting mechanism is mounted at a bottom of the fixing seat.

2. The portable mobile phone storage box for bicycling according to claim 1, wherein a raised portion is disposed at a top of one side of the base, and the shading plate is located above the raised portion.

3. The portable mobile phone storage box for bicycling according to claim 1, wherein the supporting mechanism comprises a first support and a first arc-shaped limiting block, wherein one end of the first support is mounted on the fixing seat, a second arc-shaped limiting block is disposed on one side of a bottom end of the first support, an outer end of the first arc-shaped limiting block is mounted to an outer end of the second arc-shaped limiting block in a hinged manner, and the first arc-shaped limiting block and the second arc-shaped limiting block are connected by a screw.

4. The portable mobile phone storage box for bicycling according to claim 1, wherein the supporting mechanism comprises a supporting block and a second support, wherein one end of the second support is mounted on the fixing seat, the supporting block is disposed on one side of a bottom end of the second support, and the supporting block is provided with a mounting hole which penetrates through the supporting block.

5. The portable mobile phone storage box for bicycling according to claim 1, wherein the supporting mechanism comprises an extension frame, a fixing block, and a third support, wherein one end of the third support is mounted on the fixing seat, and one end of the extension frame is disposed on one side of a bottom end of the third support; and the fixing block is disposed on another end of the extension frame, the fixing block and the extension frame are perpendicular to each other, and the fixing block is provided with two fixing holes which penetrate through the fixing block respectively.

6. The portable mobile phone storage box for bicycling according to claim 1, wherein the supporting mechanism comprises a mounting seat and an adjusting mechanism, wherein the mounting seat is mounted at the bottom of the fixing seat and provided with a mounting hole; the adjusting mechanism is mounted on the mounting hole and comprises an adjusting bar and a fixing screw, wherein a mounting block is arranged at a top of the adjusting bar and in limiting fit with the mounting hole; the fixing screw is mounted on the mounting block; the mounting block is provided with a via hole through which a bottom of the adjusting bar passes; and the adjusting bar is provided with a plurality of adjusting grooves which is in limiting fit with the fixing screw.

* * * * *